United States Patent
MacDougall

(10) Patent No.: US 6,997,173 B2
(45) Date of Patent: Feb. 14, 2006

(54) METHOD FOR SHIPBOARD OPERATION OF ELECTROMAGNETIC GUN AND ROTATING PULSE FORMING NETWORK

(75) Inventor: Frederick W. MacDougall, San Diego, CA (US)

(73) Assignee: General Atomics, San Diego, CA (US)

( * ) Notice: Subject to any disclaimer, the term of this patent is extended or adjusted under 35 U.S.C. 154(b) by 261 days.

(21) Appl. No.: 10/759,979

(22) Filed: Jan. 16, 2004

(65) Prior Publication Data

US 2005/0016373 A1 Jan. 27, 2005

Related U.S. Application Data

(62) Division of application No. 10/319,450, filed on Dec. 12, 2002, now Pat. No. 6,766,793.

(51) Int. Cl.
*F41B 6/00* (2006.01)

(52) U.S. Cl. ............................. 124/3; 89/8
(58) Field of Classification Search .............. 124/3; 42/84; 89/8

See application file for complete search history.

(56) References Cited

U.S. PATENT DOCUMENTS

| | | | | |
|---|---|---|---|---|
| 1,565,895 A | * | 12/1925 | Blaustein | 124/3 |
| 1,987,912 A | * | 1/1935 | Rady et al. | 42/84 |
| 3,431,816 A | * | 3/1969 | Dale | 89/8 |
| 3,503,300 A | * | 3/1970 | Dardick | 89/8 |
| 3,832,569 A | * | 8/1974 | Anderson et al. | 307/110 |
| 4,343,223 A | | 8/1982 | Hawke et al. | 89/8 |
| 4,608,908 A | * | 9/1986 | Carlson et al. | 89/8 |
| 4,722,057 A | | 1/1988 | Gustavsson et al. | 364/423 |
| 4,753,153 A | * | 6/1988 | Jasper, Jr. | 89/8 |
| 4,840,107 A | * | 6/1989 | Weldon | 89/8 |
| 4,907,487 A | * | 3/1990 | Tidman et al. | 89/8 |
| 4,913,029 A | * | 4/1990 | Tidman et al. | 89/8 |
| 4,913,030 A | * | 4/1990 | Reynolds | 89/8 |
| 4,944,212 A | * | 7/1990 | Hilal | 89/8 |
| 5,233,902 A | * | 8/1993 | Bernardes | 89/8 |
| 5,261,315 A | * | 11/1993 | Marinos | 102/202.7 |
| 5,355,764 A | * | 10/1994 | Marinos et al. | 89/8 |
| 5,375,504 A | | 12/1994 | Bauer | 89/8 |
| 5,417,140 A | * | 5/1995 | Onozuka et al. | 89/8 |
| 5,763,812 A | * | 6/1998 | Collins | 89/8 |
| 5,800,857 A | * | 9/1998 | Ahmad et al. | 427/80 |
| 5,867,363 A | * | 2/1999 | Tsai et al. | 361/502 |
| 5,909,001 A | * | 6/1999 | Goldstein | 89/8 |
| 6,060,791 A | * | 5/2000 | Goerz et al. | 307/110 |
| 6,166,459 A | * | 12/2000 | Holland et al. | 307/109 |
| 6,215,278 B1 | * | 4/2001 | Okamura et al. | 320/119 |

FOREIGN PATENT DOCUMENTS

| | | | |
|---|---|---|---|
| EP | 0 666463 A1 | | 8/1995 |
| GB | 723586 | | 2/1955 |
| GB | 2202313 A | * | 9/1988 |
| GB | 2211589 A | | 7/1989 |

* cited by examiner

*Primary Examiner*—Michael J. Carone
*Assistant Examiner*—Troy Chambers
(74) *Attorney, Agent, or Firm*—Fitch, Even, Tabin & Flannery

(57) ABSTRACT

An electromagnetic gun and rotating pulsed network system that includes a gun barrel coupled to a gun mount coupled on a rotating platform on one deck of a naval ship. A pulse forming network which is cylindrical in shape provides pulsed energy to the electromagnetic gun and is rotatable within a cylindrical bulkhead located on a lower deck of the ship. The pulse forming network rotates in unison with the gun barrel on the same axis, allowing unbroken cables to couple the pulse forming network to the gun. The pulse forming network includes wedge-shaped capacitor modules that, when juxtaposed, collectively form a substantially cylindrical shape.

8 Claims, 10 Drawing Sheets

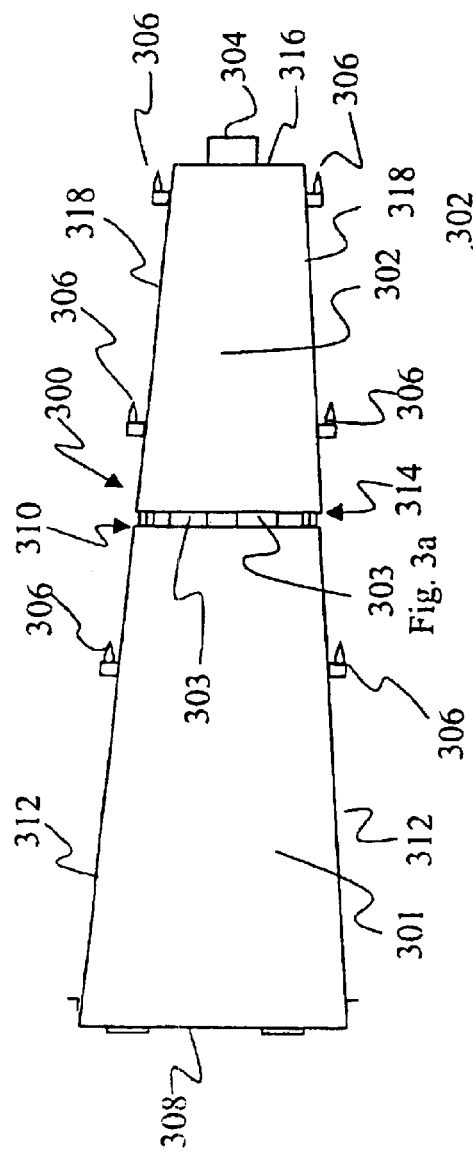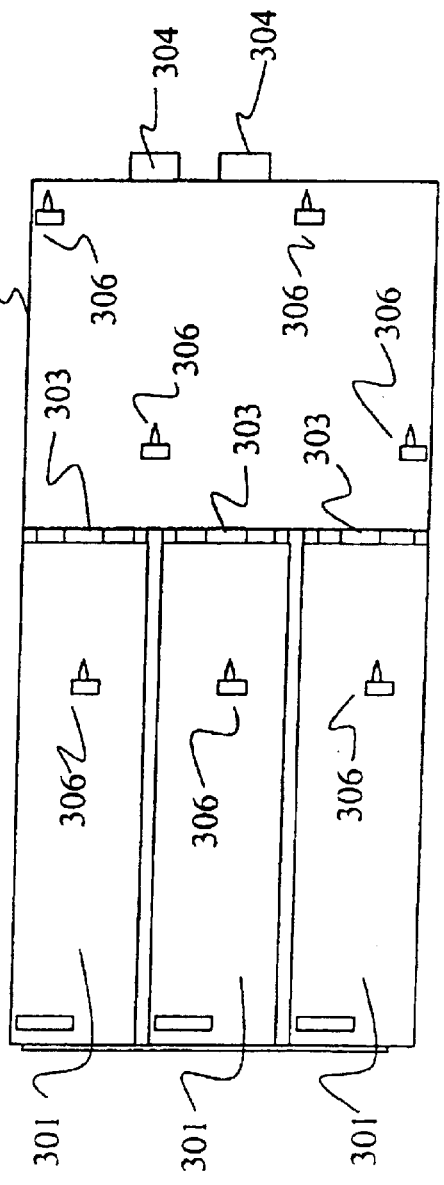
Fig. 3a
Fig. 3b

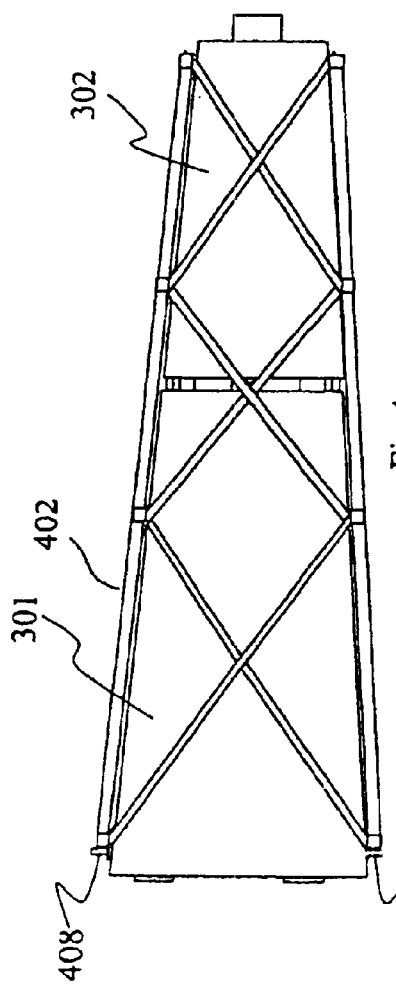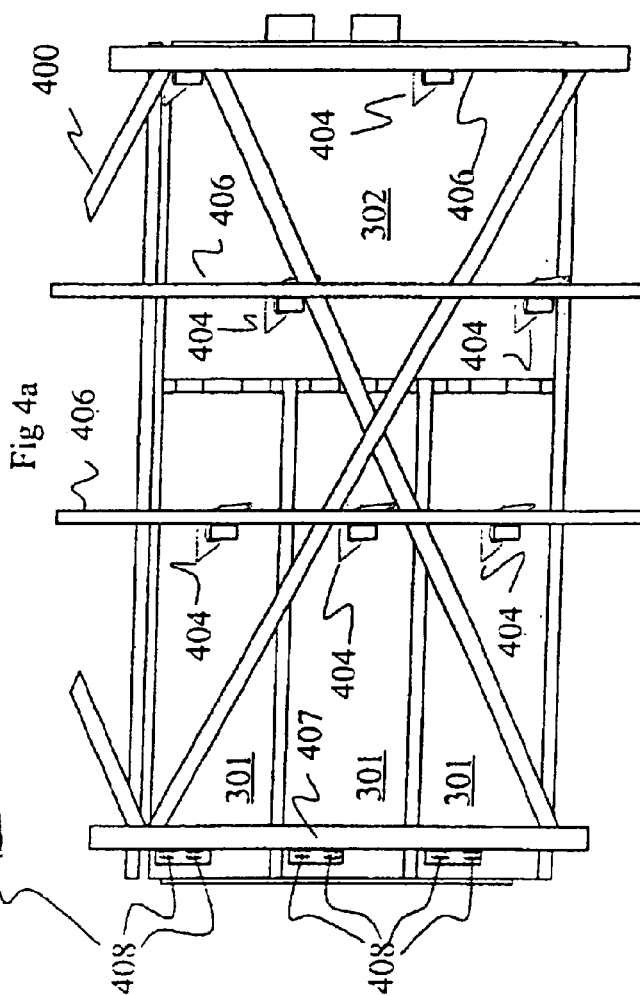
Fig 4a
Fig 4b

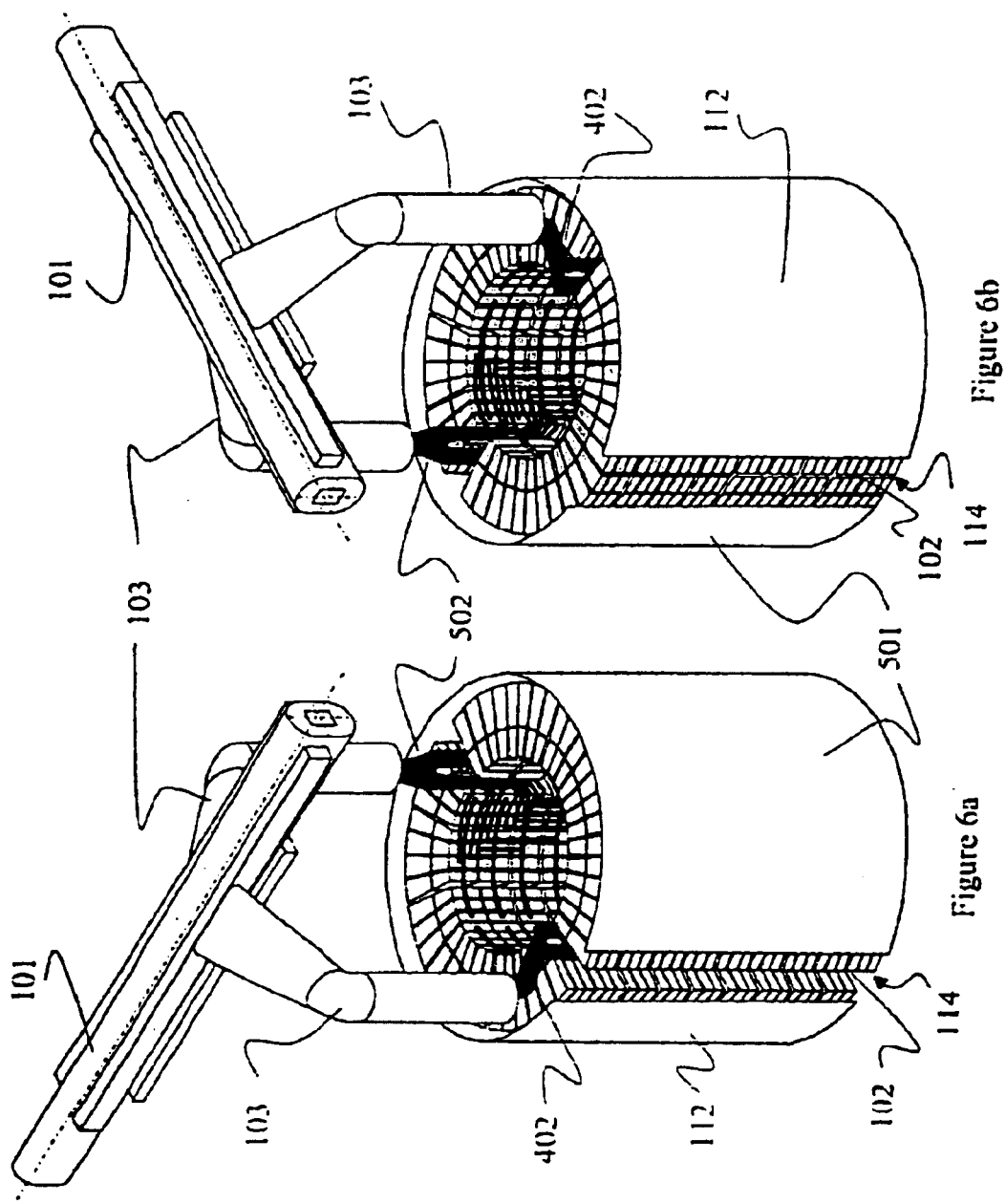

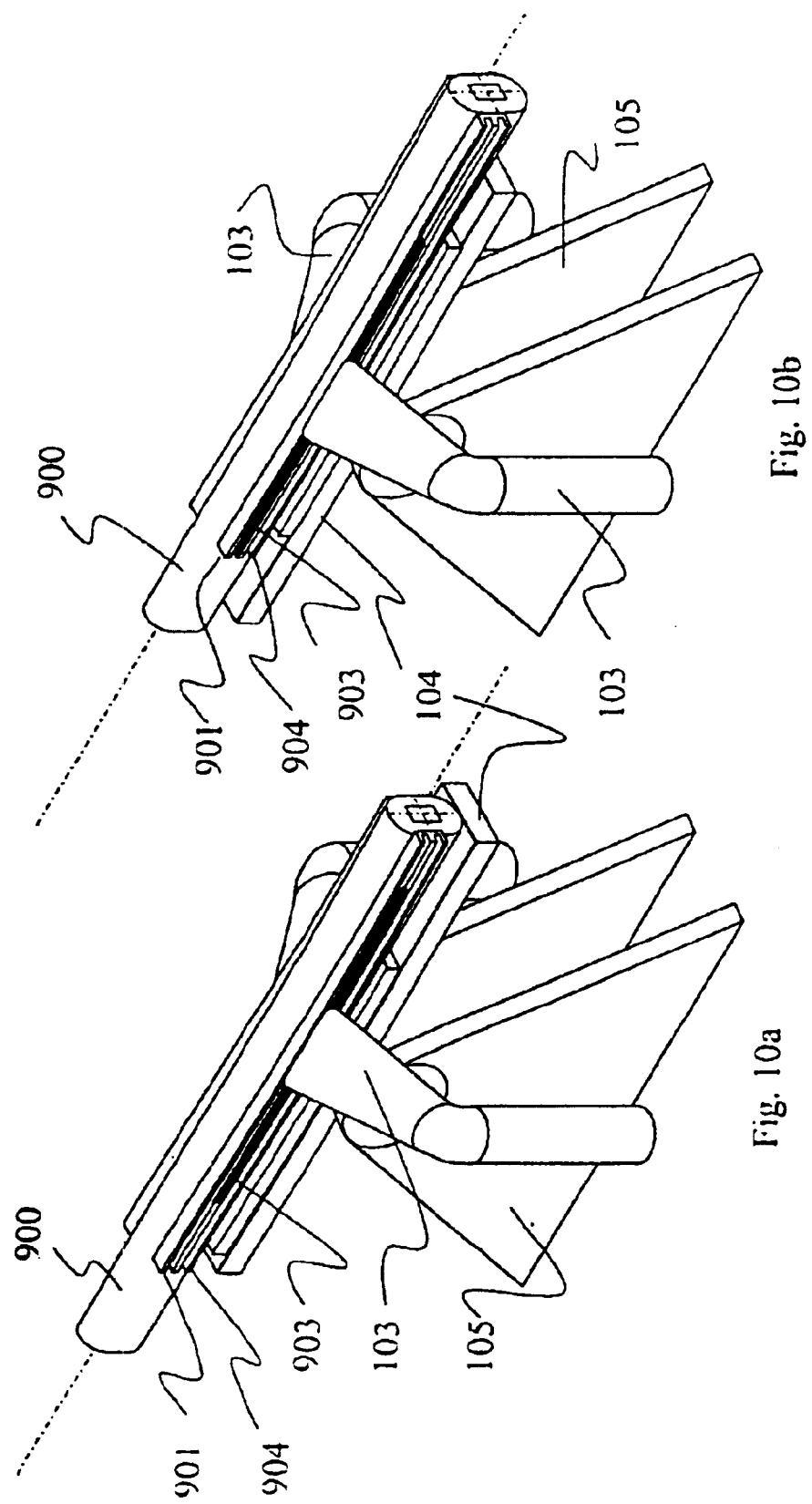

METHOD FOR SHIPBOARD OPERATION OF ELECTROMAGNETIC GUN AND ROTATING PULSE FORMING NETWORK

This application is a division of U.S. Ser. No. 10/319,450 filed Dec. 12, 2002 now U.S. Pat. No. 6,766,793, the disclosure of which is incorporated herein by reference.

BACKGROUND OF THE INVENTION

1. Field of the Invention

The present invention relates generally to electromagnetic guns, and more specifically to an electromagnetic gun for shipboard use and an associated pulse forming network system and to a method for operating same.

2. Discussion of the Related Art

Electromagnetic (EM) guns operate by storing a large amount of energy in one or more storage units over several seconds or minutes. This energy is then released over a period of hundreds of microseconds to milliseconds to the gun through a pulse forming network (PFN). The PFN controls an energy pulse or pulses so that the maximum energy is imparted to the projectile.

There are several types of EM guns. A rail gun is one of these. It is operated by placing a projectile between two electrically charged rails and creating an arc behind the projectile. The electromagnetic force created when the current flows up to the projectile, across to the adjacent rail and back down the adjacent rail causes the arc to move up the barrel and push the projectile ahead of it.

A second EM gun is a coil gun. With a coil gun, a series of coils surround the barrel, and the coils are energized in sequence starting from the back of the gun. As each coil is energized, the projectile is pulled into the coil like a solenoid.

A third type of gun which might use this invention is the Electrothermo Chemical (ETC) gun. While an ETC gun is not generally considered an EM gun, it does require a substantial discharge of energy to bring the chemical propellant up to temperature. Typically most of the energy for this type of gun is obtained from the chemical propellant and the amount of energy required from the PFN is significantly less than an EM gun.

There are a number of different methods of storing energy for an EM or ETC gun. Most of today's large EM gun experiments are driven by electrostatic capacitor bank based energy storage devices. The capacitors are charged over a few seconds and then discharged through a PFN. Capacitor banks are normally modular in nature where several elements are connected in parallel or in series and parallel.

Rotating machinery such as a compulsator (compensated pulsed alternators) or homopolar generators is another method used to store energy for an EM or ETC gun. With this system, a rotating mass is spun at a very high speed and kinetic energy is stored in the speed of the rotating mass. To get the energy out of the rotating mass, it is slowed down using an electrical braking method that results in a large current pulse emanating from the device. This current pulse is then shaped using a PFN and delivered to the gun barrel.

Electrolytic capacitors, as opposed to electrostatic capacitors can also be used to drive electric guns. The electrolytic capacitor generally has a longer time constant and sometimes has difficulty in responding fast enough to drive fast rail guns.

Two other devices that can be used for electric gun energy storage are batteries and chemical-double-layer capacitors. Like the electrolytic capacitor, both of these devices have a high energy density and relatively high internal impedance. The high internal impedance results in a relatively slow response time and high internal losses. For this reason, these devices are normally not used for large EM or ETC guns.

Modem EM Naval guns are being designed with ranges of about 300 miles. To achieve this range, a 20 kg projectile requires a muzzle velocity of 2.5 kilometers per second km/s or a muzzle energy of 63 Mega Joules (MJ). To accomplish this, approximately 150 MJ needs to be delivered to the gun. The stored energy for such a system is approximately 200 MJ. Thus, regardless of the energy storage means, a substantial volume is required to store the energy that needs to be delivered to the gun.

SUMMARY OF THE INVENTION

The invention provides an improved arrangement of operating an electromagnetic gun in a shipboard environment. A gun mount for a gun barrel is mounted on a rotating platform above a pulse forming network that is electrically coupled thereto, which network rotates about a similar axis.

In one particular aspect, the invention provides a method for operating an electromagnetic gun in a shipboard environment, which method comprises:
providing an electromagnetic gun; coupling the electromagnetic gun to a rotatable platform on a ship in a location which is open to the surrounding environment;
providing a pulse forming network having a substantially circular cross-sectional shape within a substantially cylindrical bulkhead located on a deck of the ship below the rotatable platform; electronically connecting the pulse forming network to the gun; providing energy from the ship to charge the pulse forming network; and
transferring pulsed energy from the pulse forming network to the electromagnetic gun.

In another particular aspect, the invention provides a capacitor module for a pulse forming network, which module comprises: a capacitor unit oriented in a radial direction with respect to a central axis of the network, the capacitor unit having an outer end wall, an inner end wall and side surfaces that extend between the outer and the inner end walls; wherein the outer and inner end walls are aligned substantially normal to the radial direction and the outer end wall is wider than the inner end wall so that the capacitor unit tapers inward from the outer end wall to the inner end wall.

BRIEF DESCRIPTION OF THE DRAWINGS

The above and other aspects, features and advantages of the present invention will be more apparent from the following more particular description thereof, presented in conjunction with the following drawings wherein:

FIGS. 3a and 3b are plan and side views, respectively, of one embodiment of a capacitor module of the PFN shown in FIG. 1;

FIGS. 4a and 4b are plan and side views, respectively, of a space frame for supporting the capacitor modules shown in FIG. 3;

FIGS. 6a and 6b are perspective views of the PFN and bulkhead shown in FIG. 1 that illustrate a rotating aspect of the PFN;

FIGS. 10a and 10b are perspective views of the gun barrel of FIG. 9 in a ready and a recoil position respectively.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
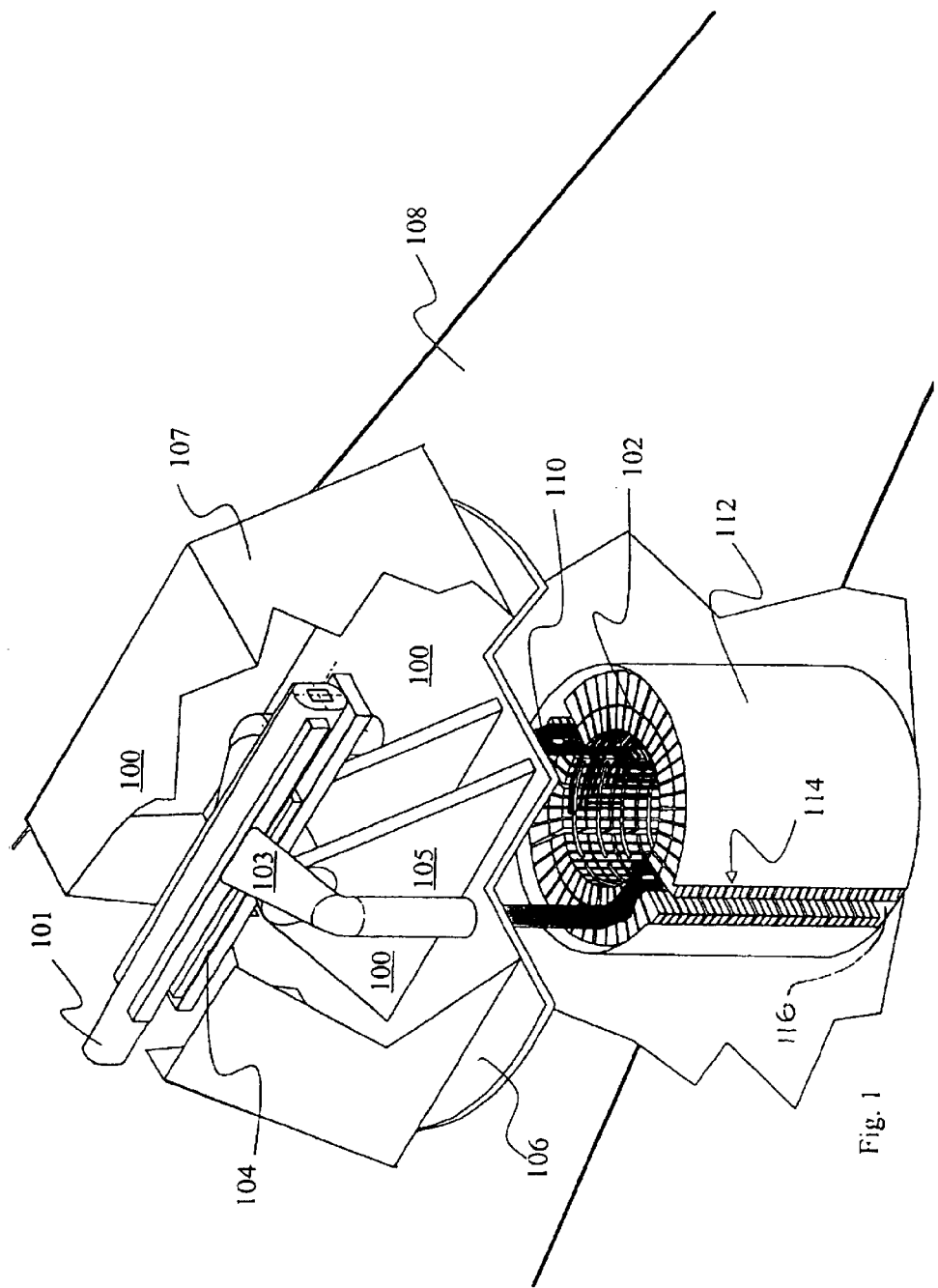
FIG. 1 is a perspective view of an electromagnetic gun and pulse forming network (PFN) in a shipboard environment in accordance with one embodiment of the present invention.

Referring to FIG. 1, shown is an electromagnetic (EM) gun and a pulse forming network (PFN) in a shipboard environment in accordance with one embodiment of the present invention. Shown is a turret 100, a gun barrel 101, a pulse forming network (PFN) 102, a flexible cable conduit 103, a recoil mechanism 104, a gun mount 105 a rotating platform or ancillary deck 106, gun armor 107, a fixed main deck of a ship 108, cables 110, a bulkhead 112, and a service port 114.

As shown, the turret 100 is coupled though its rotating deck 106, to the gun barrel 101 that is supported by the gun mount 105 and enclosed partially by the gun armor 107. The PFN 102 is within the bulkhead 112 and is located below the main deck 108, and pulsed power from the PFN 102 is fed to the gun barrel 101 via the cables 110 though cable conduit 103 on each side of the gun barrel 101. The recoil mechanism 104 for the gun is located below the gun barrel 101 leaving the sides of the gun barrel 101 open for electrical connections. In some embodiments, the gun barrel 101 is 10 meters in length, however, this is certainly not required.

As shown in FIG. 1, and in several embodiments, the PFN 102 comprises a bank of capacitors that together form a cylindrical shaped PFN that is rotatable about an axis that is substantially normal to the rotating platform 106. The PFN 102 is preferably a 200 MJ capacitor based pulse forming network that is mounted upon a rotatable circular platform or surface 116 directly below the electromagnetic gun. Advantageously, the rotating aspect of the PFN 102 allows the PFN 102 to be tightly enclosed within the bulkhead 112, and thus, occupy a minimum amount of space. The PFN 102 has a generally circular cross sectional exterior shape and is designed to fit within the bulkhead 112 with only a small gap between an outside surface portion of the PEN 102 and an inside wall of the bulkhead 112, access to various parts of the PFN 102 is obtainable by rotating the entire PFN 102 until a portion needing attention is aligned with the service port 114.

In some embodiments, the PFN 102 and the turret 100 are rotated in unison so that the cables 110, which are unbroken, i.e., without substantial change in resistance or discontinuities, may be used to couple energy from the PFN 102 to the gun barrel 101 instead of slip rings or other electromechanical coupling devices (that introduce increased resistance) between the PFN 102 and the gun barrel 101. Beneficially, the reduced resistance provided by the cables 110 allows the amount of energy stored in the PFN 102, and hence, the overall volume of the PFN 102 to be substantially less than would otherwise be required if slip rings or other electromechanical coupling devices were used because energy losses in electrical connections between the PFN 102 and the gun barrel 101 are proportional to the product of resistance (which is greater with slip rings) and the square of the electrical current traveling through the connections.

Another beneficial aspect of several embodiments of the present invention is a reduction in deleterious effects of gun recoil on the electrical connections, e.g., the cables 110, between the PFN 102 and the gun barrel 101. Specifically, in some embodiments, as described further with reference to FIG. 7, the electrical connections that are accelerated with the recoil are encased in a fluid of approximately the same density as the electrical connections, e.g., the cables 110 so that forces imparted on the electrical connections are coupled to the shell of the casing. In other embodiments, as discussed with reference to FIG. 10, the cables 110 are connected to a slip-rail connection so that the cables 110 remain stable when the barrel moves due to recoil.

Although the EM gun shown in FIG. 1 is a rail gun, it is important to note that the present invention is not limited to rail guns and may include coil guns and Electrothermo Chemical (ETC) guns. While ETC guns are often categorized as something other than EM guns, ETC guns require a substantial discharge of energy to bring the chemical propellant up to temperature, and thus, for purposes of this disclosure, fall under the rubric of EM guns and are well within the scope of the present invention.

It is also important to note that while the PFN 102 is preferably an electrostatic capacitor based pulse forming network, the PFN 102 in other embodiments, may potentially be an electrolytic based capacitor system, a chemical-double-layer capacitor based system, a battery based system and/or a compulsator based system.

Figure 2:
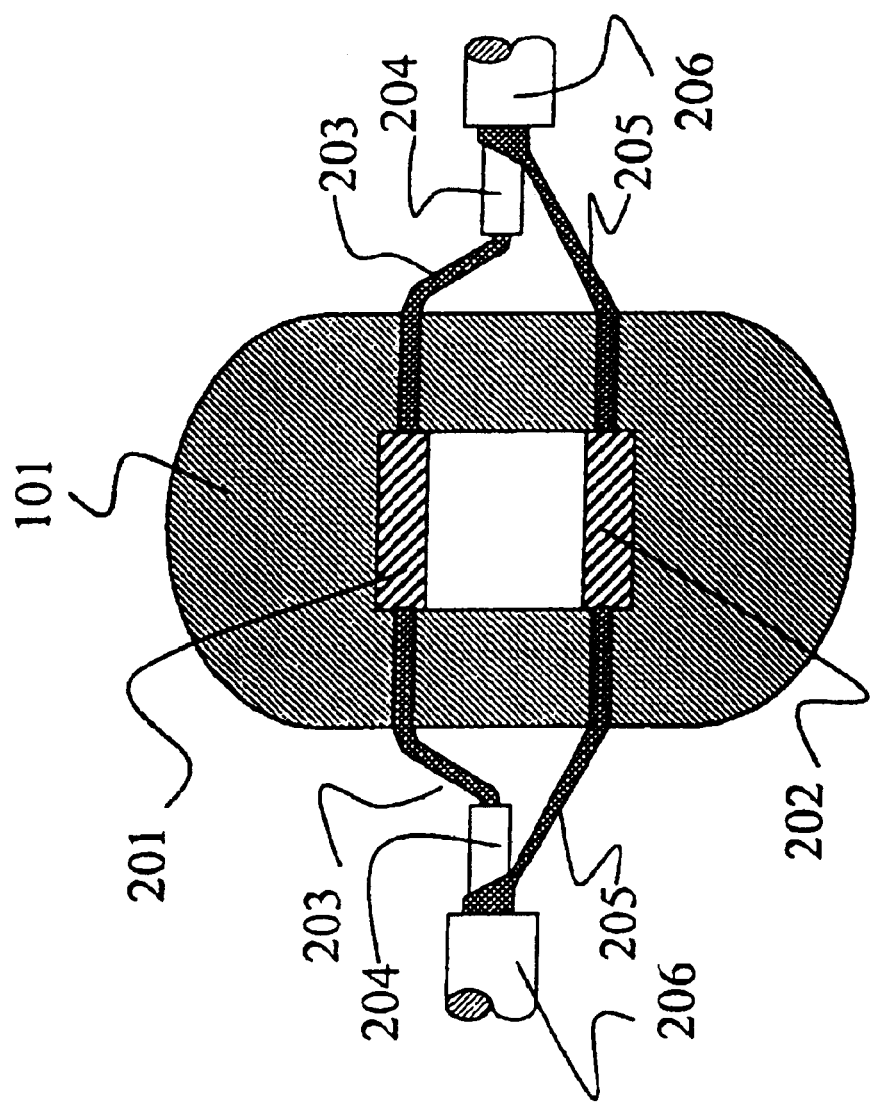
FIG. 2 is a is a cross sectional view of one embodiment of the gun barrel shown in FIG. 1.

Referring next to FIG. 2, shown is a cross sectional view of one embodiment of the gun barrel 101 of FIG. 1 illustrating electrical connections to top and lower rails of the gun barrel 101. Shown are top and lower rails 201, 202 of the gun barrel 101 that are electrically connected to two coaxial cables 206 on each side of the barrel. Also shown are center cable conductors 203 that electrically couple the top rail 201 to center conductors of the two coaxial cables 206, and outside cable conductors 205 that electrically couple the lower rail 202 to outer conductors of the two coaxial cables 206. Although two electrical connections are shown in the cross section view of the gun barrel 101 of FIG. 2, it should be recognized that in several embodiments, many connections, e.g., along the length of the gun barrel 101, are required to manage current required for a large rail gun. Smaller guns, however, may be able to operate with one electrical connection to each rail.

Referring next to FIGS. 3a and 3b, shown are a plan and side view respectively of one capacitor module 300 of the PFN 102 of FIG. 1 in accordance with one embodiment of the present invention. As discussed further herein, the PFN 102 in several embodiments is comprised of several capacitor modules 300.

As shown in FIG. 3b, the capacitor module 300 in the present embodiment is made up of three capacitor units 301 and one coupling module 302. The coupling module 302, in several embodiments, provides switch, fuse and inductor functionality and couples the capacitor units 301 with a PFN buss. The units have flat upper and lower surfaces so they can be stacked, and three capacitor units 301 are connected to one coupling module 302 via bayonet type fittings or bushings 303.

In several embodiments, the capacitor modules 300, the capacitor units 301 and the coupling modules 302 are wedge-shaped. In one embodiment, as shown in FIG. 3a, the capacitor units 301 include an outer end wall or edge 308 that is wider than an inner end wall or edge 310 and substantially flat side portions or surfaces 312 that taper the profile of the unit extending from the outer end wall 308 to the inner end wall 310, i.e. the distance between the side surfaces 312 decreases from the outer end wall 308 in the direction of the inner end wall 310. Similarly, coupling modules 302 have a radially outer end wall 314, an inner end wall 316 and substantially flat side surfaces 318 that taper from the outer end wall 314 to the inner end wall 316; thus the distance between side surfaces 318 of the coupling modules 302 likewise decreases from the outer end wall in the direction of the inner end wall 316.

Beneficially, the wedge shape of the capacitor units 301 and utilization of the bayonet type fittings 303 allows the capacitor units 301 to be easily removed in a radial direction from the PFN 102. Once the three capacitor units 301 have been removed, the coupling module 302 can also be removed in the radial direction. In some embodiments, the entire capacitor module 300 will be removable as a unit. The coupling module 302 is designed to be connected to a PFN buss by bayonet type fittings or bushings 304.

Both the capacitor units 301 and the coupling module 302 carry centering pin mounts 306 that extend outwardly from the flat side surfaces thereof and allow the capacitor module 300 to be positioned precisely in a space frame when they are received in holes or receptacles carried by the space frame, as discussed further with reference to FIGS. 4a and 4b.

FIGS. 4a and 4b show plan and side views respectively of a space frame 400 for supporting the capacitor modules 300 of FIG. 3. As shown in FIG. 4a, the space frame 400 has horizontal members 402 that are configured to accommodate the wedge-shaped capacitor modules 300 and interconnected vertical members 406. The centering pins 306 extending laterally outward therefrom are securely received in holes or receptacles 404 in the vertical members 406 of the space frame 400. Additionally, as shown in FIG. 4b, the receptacles include latches carried by the vertical members 406 of the space frame 400 which are designed to lock the centering pin mounts 306 of the capacitor module 300 in place. Further, a vertical member 407 of the space frame at the radially outer end thereof has tapped holes to accept bolts 408 that pass through openings in side flanges provided on the capacitor units 301 and, along with the centering pins 306 and latches 404, firmly secure each capacitor module 300 firmly in place.

Figure 5B:
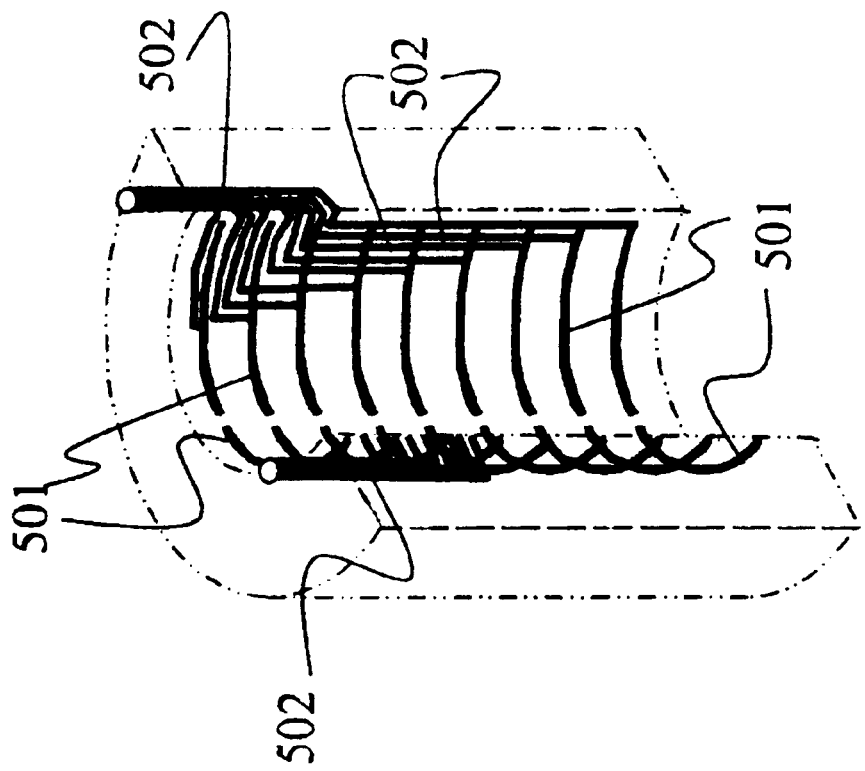
FIGS. 5a and 5b are perspective views of one half of the capacitor based PFN shown in FIG. 1 in accordance with one embodiment of the present invention.
Figure 5A:
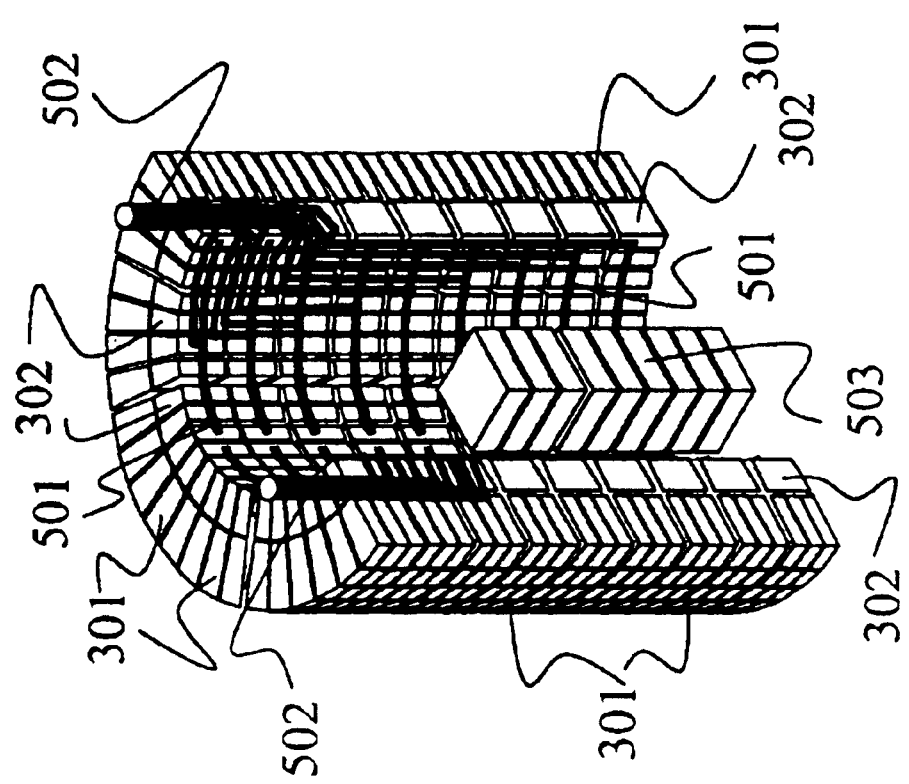

Referring next to FIGS. 5a and 5b, shown is one half of the capacitor based PFN 102 of FIG. 1 in accordance with one embodiment of the present invention. As seen in FIG. 5a, the capacitor modules 300, that include capacitor units 301 and the coupling module 302, are stacked on top of one another, and the stacks are juxtaposed so each module is located at substantially the same distance from the central axis of the PFN 102 which has an annular configuration with a circular cylindrical outer surface.

In several embodiments, and as shown in FIGS. 5a and 5b, the coupling modules 302 are connected in groups with interconnecting PFN busses 501. In the half of the PFN 102 shown in FIG 5a, there are a total of 18 independent PFN busses 501. The electrical connection from the PFN busses 501 to the gun barrel 101 on the deck above is made with coaxial cables 502, and there is one coaxial cable 502 per PFN buss 501. For purposes of clarity, FIG. 5b shows high energy current connections in the PFN 102 that include the busses 501 and the coaxial cables 502; other parts of the PFN 102 have been removed or are shown in ghost outline.

Also shown in FIG. 5a are capacitor charging power supplies 503 for the half of the PFN 102 shown. In this configuration, there is one power supply 503 for each layer of switch, fuse and inductor modules in the shown half of the PFN 102. A single power supply 503 is connected to all capacitors that are electrically connected to two of the busses 501 where the two busses are on the same level and in the same half of the bank. Connections from the ship's power to the capacitor charging power supplies 503 and from the power supplies 503 to the capacitor units 301 are standard and are not shown. These connections are relatively low in current compared to the high current connections detailed in FIG. 5b.

Referring next to FIGS. 6a and 6b, a service port 114 in the bulkhead 112 and a rotating aspect of the PFN 102 are shown according to one embodiment of the present invention. As shown in FIG. 6a, the service port 114 is an opening in the cylindrical bulkhead 112 that allows access to the PFN 102. In FIG. 6a, the PFN 102 has been angularly positioned so that one split or division between the two halves of the PFN 102 is aligned with the service port 114. With the PFN 102 in this position, the interior of the PFN 102 is accessible through the gap between the two halves.

In FIG. 6b, the PFN 102 and gun barrel 101 have been rotated in unison 90° from their respective positions in FIG. 6a, and a column of capacitor units in the PFN 102 is accessible for removal via the service port 114 in the bulkhead 112. The coupling module 302 is designed to be removed with or after the capacitor units associated with the module have been removed through the service port 114. Advantageously by rotating the PFN 102, any part of the PFN 102 can be accessed; thus, the amount of space required on a naval vessel, as demarcated by the bulkhead 112, is minimized because extra space between the PFN 102 and the bulkhead 112 need not be set aside to accommodate removal of capacitor units 301 and coupling modules 302 or complete capacitor modules 300.

Preferably, the PFN 102 and bulkhead 112 have substantially circular cross sections, i.e., the cross section of the PFN normal to its axis of rotation is substantially circular; however, other configurations may be employed. Specifically, the PFN may take on other substantially circular forms, i.e., forms that would still permit the PFN 102 to rotate within a cylindrical bulkhead 112. For example, the PFN 102 may have a conical shape, or may be elliptical, but may still rotate within the illustrated bulkhead 112. Similarly, the bulkhead and particularly its exterior surface 112 need not be perfectly circular so long as it would still allow the PFN 102 to rotate freely within.

Large guns normally have a significant movement due to recoil. When a projectile moves forward through a gun barrel, the gun barrel moves backward. The difference in velocity between the projectile and the barrel is inversely proportional to mass ratio of the projectile and the barrel. An unrestricted barrel, for example, with a mass of 20,000 kg firing a 20 kg projectile at 3.5 km/s would have a velocity of approximately 111 m/s in the opposite direction of the projectile. The movement of the barrel is normally restricted by a recoil mechanism 104. Such movement can create potential problems for interconnections between the PFN 102 and the barrel 101.

Figures 7A, 7B:
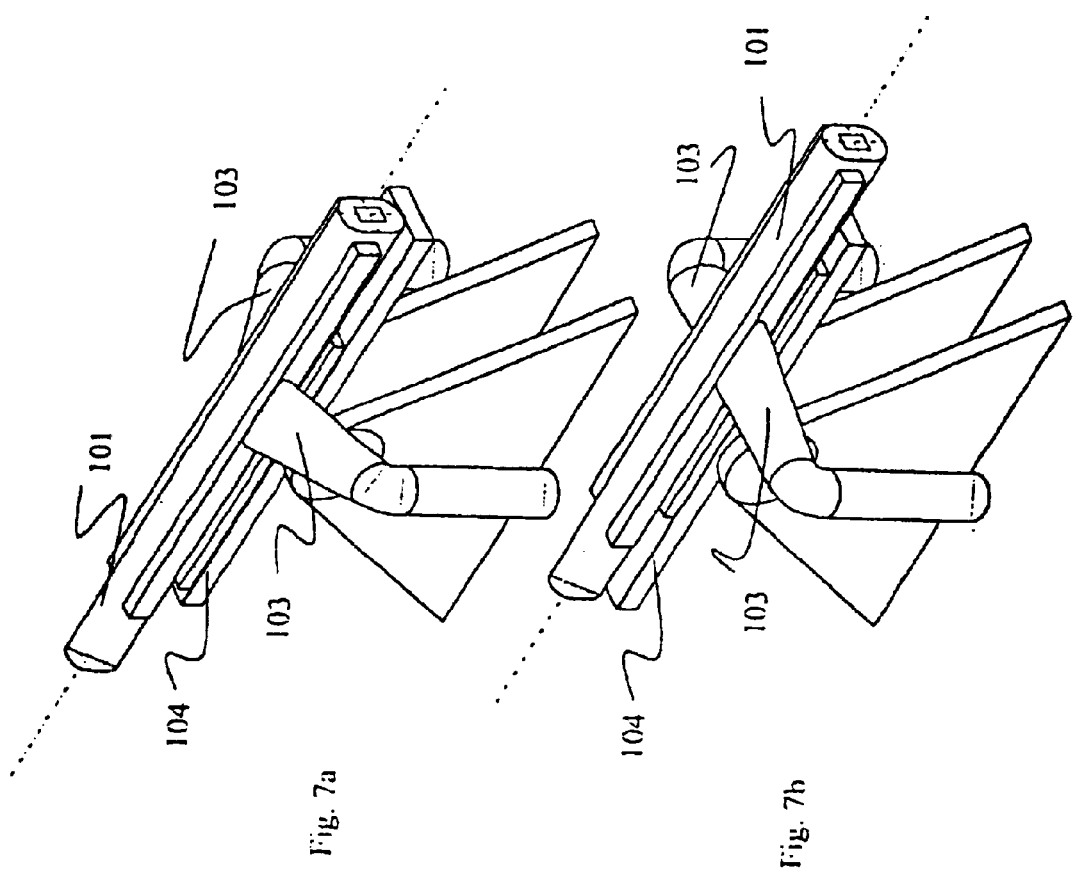
FIGS. 7a and 7b are perspective views of the gun barrel of FIG. 1 in a ready position and a recoil position respectively.
Figure 8A:
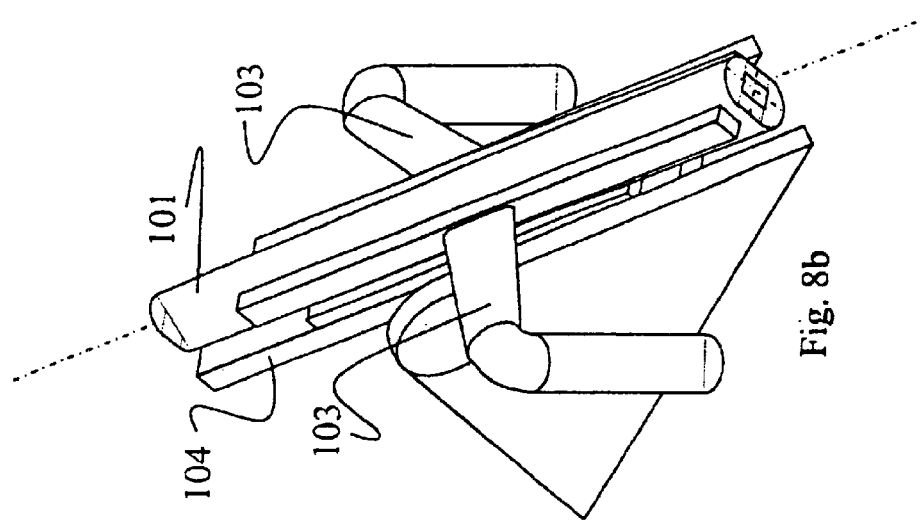
FIGS. 8a and 8b are additional perspective views of the gun barrel of FIG. 1 in a ready and a recoil position respectively.
Figure 8B:
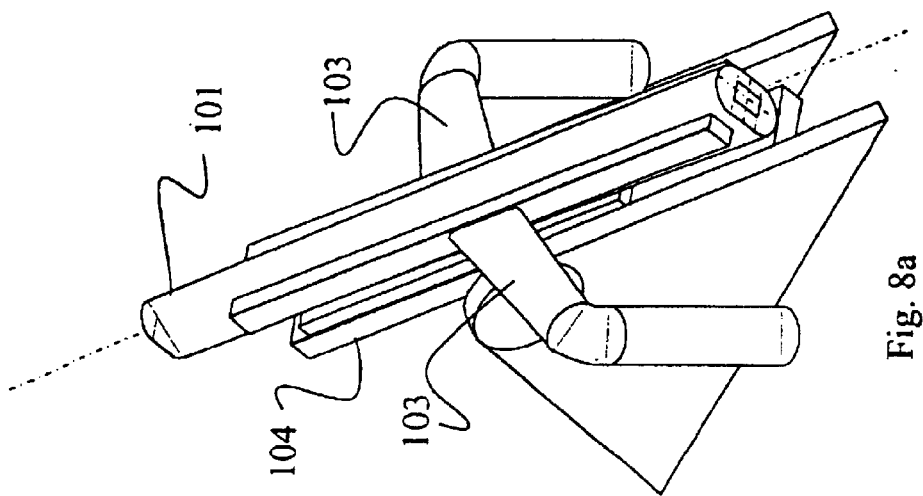

Referring to FIGS. 7a and 8b, the barrel 100 is shown in both ready and recoiled positions. Specifically, FIGS. 7a and 8a show the barrel 101 in the ready position, and FIGS. 7b and 8b show the barrel 101 in the recoiled position. The flexible cable conduit 103 is designed to allow the cable harness 502 (FIGS. 6a and 6b) to flex allowing the cables 206 to move relative to each other when the barrel moves between the ready and the recoil positions as shown in FIGS. 7a and 8b.

To prevent stress from building up in the cables during gun recoil, the upper part of the cable conduit 103 that must move when the barrel recoils may be filled with a fluid that surrounds the individual cables 206 in the harnesses 502. A wide variety of fluids could be used for this purpose, e.g., water or transformer oil, each having certain advantages. This fluid is preferably about the same density as the cables so that, when the gun recoils, the cables 206, which are floating in the fluid-filled conduits 103, accelerate together with the fluid, thus reducing the stress in each cable by pressurizing the fluid and transmitting the force to the conduit 103 which provides an outer wall or shell.

Figure 9:
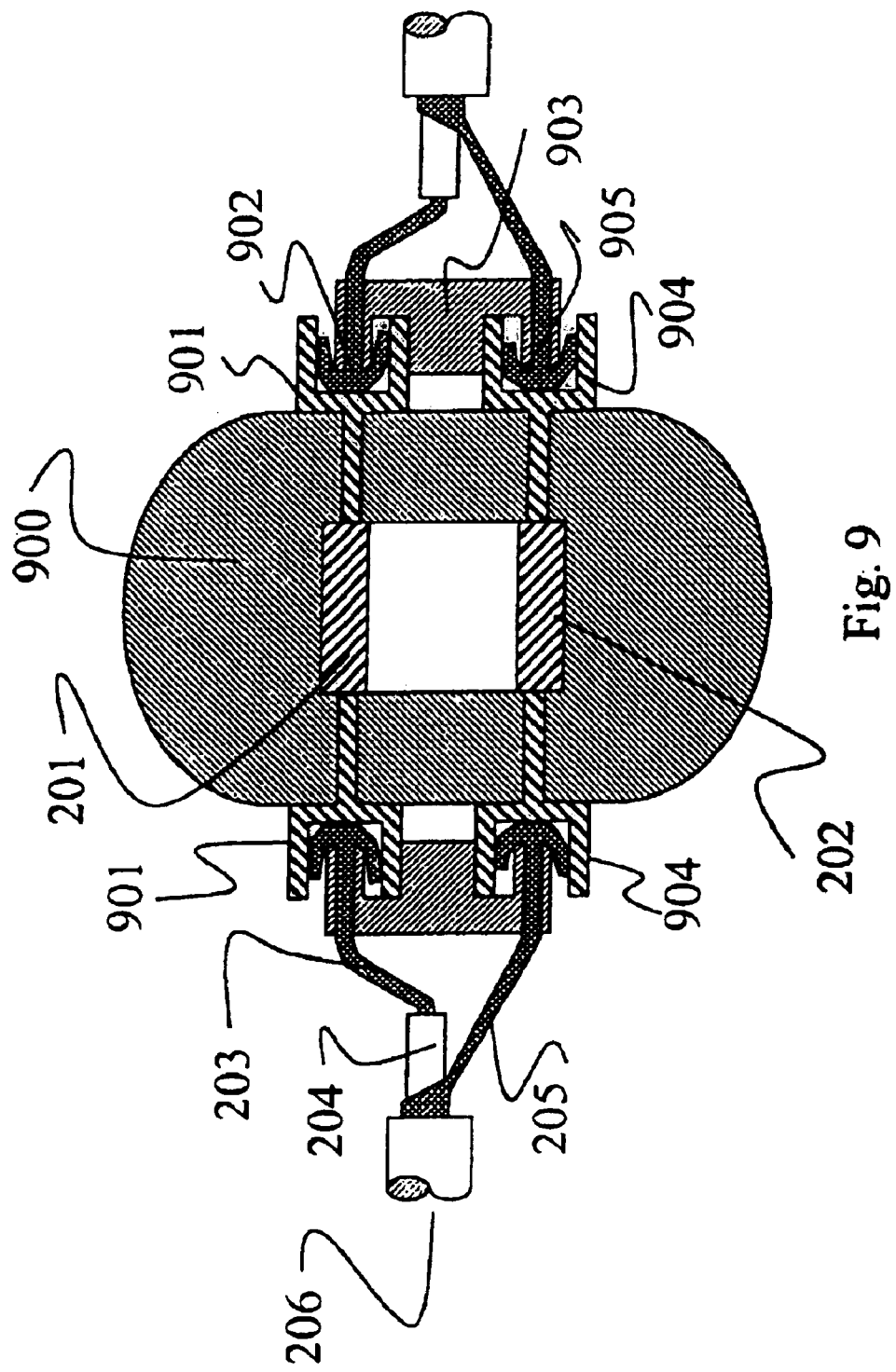
FIG. 9 is a cross sectional view of an alternative gun barrel with slip rails.

In another embodiment, the connection between the cables 206 and the barrel 101 are made with sliding contacts, as is shown in FIGS. 9 and 10, where the cables 206 do not accelerate during recoil.

FIG. 9 shows a cross sectional view of a barrel 900 with slip rails 901 that allow the barrel 900 to recoil without moving the cables 206. Shown are two upper slip rails 901, one positioned on each side of the barrel 900, and two lower slip rails 904 that are also positioned on opposite sides of the barrel 900 below the upper slip rails 901. The pairs of upper and lower slip rails 901, 904 electrically interconnect respectively with the top and lower rails 201, 202 of the gun barrel 900 and also provide elongated, grooved receptacles for receiving electrical connectors 902, 905 that are coupled respectively with the center connector 203 and the outside connector 205 of the cables 206. The connectors 902, 905 fit into the elongated grooves of the upper and lower slip rails 901, 904 where they can slide within the slip rails 901, 904 while maintaining contact with the slip rails. They are preferably mounted through a static insulated support 903.

FIGS. 10a and 10b show perspective views of the barrel 900 in a ready and a recoil position, respectively; the static support 903 stays fixed relative to the gun mount 105 rather than moving with the barrel 101 when the gun recoils. Thus, as shown in FIG. 10b, the cable conduit 103, the cables 206 and cable harness 502 remain relatively static as the barrel 900 recoils—minimizing the stress on these parts of the system.

While the invention herein disclosed has been described by means of specific embodiments and applications thereof, numerous modifications and variations could be made thereto by those skilled in the art without departing from the scope of the invention that is set forth in the claims appended hereto.

What is claimed is:

1. A method for operating an electromagnetic gun in a shipboard environment, which method comprises:

providing an electromagnetic gun;

coupling the electromagnetic gun to a rotatable platform on a ship in a location which is open to the surrounding environment;

providing a pulse forming network having a substantially circular cross-sectional shape within a substantially cylindrical bulkhead located on a deck of the ship below the rotatable platform;

electronically connecting the pulse forming network to the gun;

providing energy from the ship to charge the pulse forming network; and transferring pulsed energy from the pulse forming network to the electromagnetic gun.

2. The method of claim 1 further comprising:

providing a vertically aligned service port in the cylindrical bulkhead to provide access to the pulse forming network.

3. The method of claim 2 further comprising:

rotating the pulse forming network within the cylindrical bulkhead to provide access to components of the pulse forming network at different angular positions via the service port in the bulkhead.

4. The method of claim 1 further comprising:

rotating the pulse forming network and the electromagnetic gun in unison to aim the gun at a target.

5. The method of claim 1 wherein pulsed energy from the pulse forming network is provided to the electromagnetic gun via unbroken cabling.

6. A method for operating an electromagnetic gun in a shipboard environment, which method comprises:

supporting an electromagnetic gun upon a rotatable platform on one deck of a ship;

providing a pulse forming network having a substantially circular cross sectional shape;

locating the pulse forming network within a bulkhead located vertically below the rotatable platform on a lower deck of the ship and supporting same to rotate on the same axis as the platform;

electrically coupling the electromagnetic gun on the rotatable platform to the pulse forming network;

providing energy from the electrical system of the ship to charge the pulse forming network; and causing pulsed energy from the pulse forming network to flow to the electromagnetic gun to operate the gun.

7. The method of claim 6 wherein the pulse forming network and the electromagnetic gun are rotated in unison to aim the gun.

8. The method of claim 6 wherein the pulsed energy from the pulse forming network flows to the electromagnetic gun via unbroken cabling.

* * * * *

UNITED STATES PATENT AND TRADEMARK OFFICE
CERTIFICATE OF CORRECTION

| | | |
|---|---|---|
| PATENT NO. | : 6,997,173 B2 | Page 1 of 1 |
| APPLICATION NO. | : 10/759979 | |
| DATED | : February 14, 2006 | |
| INVENTOR(S) | : Frederick MacDougall | |

It is certified that error appears in the above-identified patent and that said Letters Patent is hereby corrected as shown below:

On the Title Page:

Under (56) Foreign Patent Documents, line 3, after "9/1988" insert --F41H 13/00--.

Signed and Sealed this

Twenty-sixth Day of December, 2006

JON W. DUDAS
*Director of the United States Patent and Trademark Office*